Patented Feb. 27, 1934

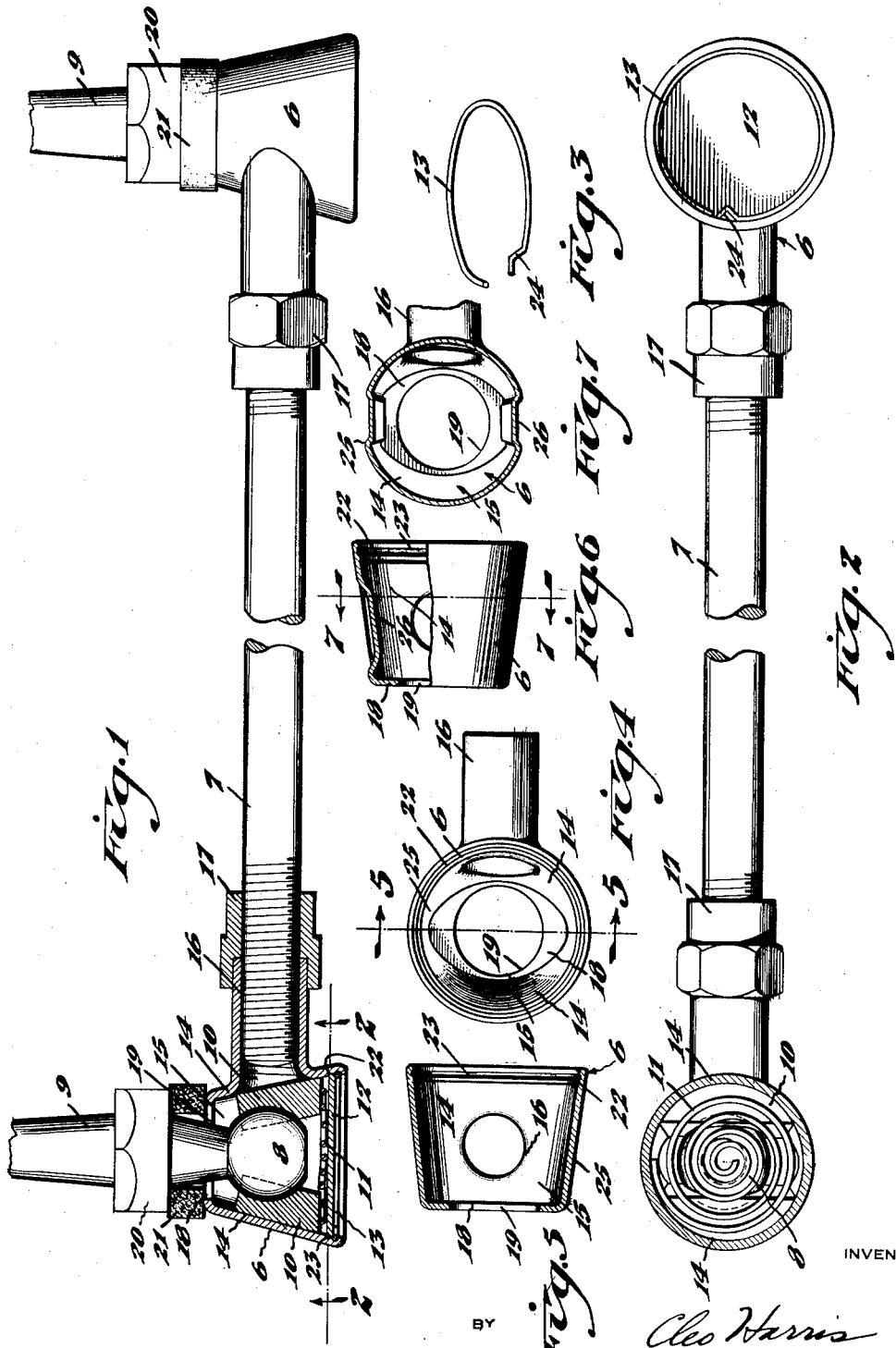

1,948,757

UNITED STATES PATENT OFFICE 1,948,757

BALL AND SOCKET JOINT

Cleo Harris, Cincinnati, Ohio, assignor, by mesne assignments, to Thompson Products, Incorporated, Cleveland, Ohio, a corporation of Ohio Application November 18, 1929
Serial No. 407,857

9 Claims. (Cl. 287—90)

This invention relates to connecting devices and is particularly directed to improvements in that type of flexible connection known as a ball and socket joint.

This form of joint commonly consists of a socket casing formed on the end of a steering reach rod, connecting link, drag link, or the like, the socket containing bearing seats disposed at respective sides of a contained ball formed on the end of a stud, crank arm, or the like.

The natural movements of the ball and seats wear the engaging surfaces and create play between the parts which must be uniformly and steadily taken up. Any play permitted to exist or increase is conducive to pounding and vibration tending to break down the strength of the metal and to unevenly wear the bearing surfaces. These destroying mediums are prevalent in most of the environments in which this type of joint is placed. The larger portion of the use is on motor vehicles where the joint is not only subjected to ordinary wear but to increased vibration caused by the motion of the car.

An object of this invention is to provide a ball and socket connection having an improved automatic wear compensating means incorporated therein. In the present instance a thimble form of socket is used wherein the ball seats have semi-cylindrical engagement with the walls of the socket and the opposing semi-cylindrical wall portions of the socket converge or incline inwardly whereby the seats urged down these surfaces are directed inwardly against the ball interposed therebetween. The further object is to provide a continuously firm and solid engagement between the seats and the casing irrespective of the position of adjustment of the seats in the socket casing.

Another object is to provide an improved arrangement of the various parts making up the joint whereby assembly thereof is greatly facilitated and the parts securely mounted.

Another object is to provide that the ball center or the axis of the stud does not shift during adjustment thereby maintaining the distance between the stud axis and the end of the connector, and therefore maintaining minimum end clearance for the connecting medium in which the joint is included.

Another object and certain advantages will be more fully apparent from the description of the following drawing in which:

Figure 1 is a view showing a connecting rod having a joint of the present invention at each end thereof, one of the joints being shown in longitudinal section for disclosing the interior construction thereof.

Figure 2 is a sectional view taken on line 2—2, Figure 1 illustrating the arrangement of a spring relative to the bearing seats.

Figure 3 is a perspective view of a spring clip for maintaining the cover plate of the joint in position.

Figure 4 is a view looking into the socket casing showing the same with the various parts removed therefrom.

Figure 5 is a sectional view taken on line 5—5, Figure 4 further illustrating the shape of the socket casing.

Figure 6 is a side elevation of a modified form of socket including a means for preventing displacement of the bearing seats.

Figure 7 is a sectional view taken on line 7—7, Figure 6.

Describing a form of socket incorporating the present improvements, a thimble or socket casing 6 is provided, secured on the end of a rod 7 of some sort and the ball end 8 of a rod or arm 9 is disposed within the socket casing. A pair of bearing blocks 10—10 is disposed at opposite sides of the ball and journalled within the casing, a spring 11 urging the ball seats downwardly on converging walls of the socket casing. A cover plate 12 maintains the spring under compression against the seats, and a quickly applied clip 13 secures the cover in place. The socket casing or thimble 6 at its open end is circular and the opposing semi-cylindrical walls 14 thereof receiving the bearing blocks, are inclined or converged inwardly from the circular open end. The blocks 10—10 having semi-cylindrical outer surfaces fit the curvature of the adjacent side walls at any point and are firmly and solidly seated thereagainst regardless of their position along the lengths of the respective semi-cylindrical walls. Thus as the seats move downwardly and under the action of the spring they are always firmly mounted.

Referring specifically to the views of the drawing, the socket casing comprises the main socket chamber 15 and an attaching sleeve 16 extending radially or substantially radially therefrom. This sleeve portion is interiorly threaded so that it may be screwed on the end of the threaded rod 7 as illustrated in Figure 1. A lock nut 17 secures the socket casing in its location on the rod, this nut being screwed back against the sleeve of the casing after assembly on the rod for setting the same in adjusted position. The socket chamber is in the form of an irregularly tapered tube open at its large end which is perfectly circular and the oval lower end thereof is closed by a wall 18 the end wall being provided with a circular opening 19 concentric with the open end of the chamber.

The opposing cylindrical wall portions of the thimble making up the socket chamber converge toward the bottom and provide inclined surfaces against which the semicircular bearing seats are mounted. The outer or engaging surfaces of the bearing seats are curved uniformly throughout the length of the seats, this curve corresponding to the radius of the large end of the socket chamber. Likewise, a curve taken on the same radius is maintained throughout the converging length of the opposing chamber walls so that the bearing seats fit these walls at any point along their respective lengths.

The aperture in the base of the socket is of the proper diameter to permit the insertion of the ball therethrough. The ball may be on the end of a stud or arm. In the instance shown the arm is provided with an intermediate nut portion 20 and a felt packing washer 21 is inserted between the shoulder formed by the nut and the base of the socket casing for closing the aperture and preventing loss of grease.

The seats are urged downwardly into the socket by means of the spring 11 which is of tapered coil form, the large end of the coil being disposed against the blocks, and straddling the space therebetween. The spring is compressed in position by means of the circular cover or disc 12 set against a shoulder 22 formed by a counterturned portion at the large end of the chamber. An annular groove 23 is formed in this counterturned bore, this groove being semicircular in cross section and adapted to receive the circular spring clip 13. The spring clip is under outward tension and is sprung inwardly and snapped into place in the groove abutting the outer face of the disc. The spring clip is split and one end thereof is bent inwardly to form a hook portion 24 which is accessible for removing the clip from its assembled position.

It will be noted, particularly from Figure 4, that the semicircular walls of the casing or thimble terminate in irregularly curved wall portions which are indicated at 25. The contour of these wall portions joining the converging semi-cylinders is of little importance since the bearing blocks or seats engage on the true semi-cylinder portions of the thimble. The base end of the thimble is aptly described as oval, whereas the open end is circular. In the modified form of socket (see Figures 6 and 7), the walls of the casing are indented longitudinally thereof at those portions 25 thereof where the cylindrical surfaces are joined. The corrugations 26 thus formed provide the means for maintaining the blocks on the cylindrical walls. These corrugations are tapered to follow the convergence of the cylindrical walls.

Having described my invention, I claim:

1. A ball and socket joint, comprising, a socket casing, a rod having a ball formed on its end, said ball disposed within the casing, ball seats disposed within the casing at each side of the ball, the respective wall surfaces, engaged by the seats, of semi-cylindrical form and having the longitudinal extents thereof converging, and means for urging the seats against their respective wall surfaces.

2. In a device of the class described, a socket thimble, the opposing bearing surfaces of said thimble formed of semi-cylindrical contour, said surfaces converging to the base of the thimble from a perfectly circular open end thereof, a ball formed on the end of a connecting rod and disposed within the thimble, bearing blocks disposed between the ball and said bearing surfaces, the bearing blocks having semi-cylindrical wall engaging surfaces, and means for urging the seats against their respective wall surfaces.

3. In a ball and socket joint, a thimble constituted by semi-cylindrical walls converging toward the base thereof, a connecting rod having its terminal end disposed within the thimble and bearing seats journalling said terminal end, a bearing seat disposed on each semi-cylindrical wall portion and of corresponding form to fit said wall portion, and said thimble having longitudinally disposed corrugations formed in the walls thereof between the cylindrical bearing surfaces for guiding the bearing seats.

4. In a ball and socket joint, a casing at the end of a connecting rod, said casing interiorly having bearing surfaces of semi-cylindrical form having their longitudinal extents converging, bearing seats within the casing for engaging a ball therebetween each bearing seat engaged against a respective converging surface, and means normally active for urging the seats against the converging bearing surfaces and the ball.

5. A ball and socket joint comprising a ball member, socket members having ball sockets in their inner faces embracing opposite sides of said ball member, the outer surfaces of said socket members being substantially semi-cylindrical, surrounding means having substantially semi-cylindrical surfaces embracing the outer surfaces of the said socket members, the axis of the cylindrical surfaces at one side of said ball member being angularly disposed with respect to the axis of the cylindrical surfaces at the other side of the said ball member, and means causing relative movement between the said socket members and surrounding means for tightening said socket members against said ball member.

6. A ball and socket joint comprising a ball member, socket members having ball sockets in their inner faces embracing opposite sides of said ball member, the outer surfaces of said socket members being substantially semi-cylindrical, surrounding means having substantially semi-cylindrical surfaces embracing the outer surfaces of the said socket members, the axis of the cylindrical surfaces at one side of said ball member being angularly disposed with respect to the axis of the cylindrical surfaces at the other side of said ball member, and automatic means causing relative movement between said socket members and surrounding means for tightening said socket members against said ball member.

7. A joint comprising a ball stud having a spherical head, means enclosing said head having opposed convergent surfaces, at least one of said surfaces being segmental cylindrical, seat members having inner bearing surfaces engaging said head and outer bearing surfaces engaging said converging surfaces and conforming therewith, and means urging said respective engaging surfaces into closer engagement.

8. A joint comprising a casing providing internal segmental cylindrical surfaces convergent along their longitudinal extents, a ball stud having a ball end disposed within said casing, spaced seat members having inner and outer bearing surfaces engaging and conforming with the surface of said ball end and said convergent surfaces respectively and means constantly urging relative movement between said seat members and said casing to urge said seat members into closer engagement with said ball end and with said internal convergent surfaces.

9. A joint comprising a casing having internal segmental cylindrical surfaces convergent along their longitudinal extents, a ball stud having a spherical head disposed within said casing, spaced movable seat members having bearing surfaces conforming with said cylindrical surfaces and with the surface of said head respectively, a closure for the larger end of said casing and a spring disposed between said closure and said seat members to urge the latter along said convergent surfaces.

CLEO HARRIS.